United States Patent
Basson et al.

(10) Patent No.: US 7,333,555 B2
(45) Date of Patent: Feb. 19, 2008

(54) DEVICE, SYSTEM AND METHOD FOR WIRELESS COMBINED-SIGNAL COMMUNICATION

(75) Inventors: Gal Basson, Haifa (IL); Jorge Myszne, Zikron Ya'akov (IL); Yuval Finkelstein, Yokneam Elite (IL); Shay Waxman, Haifa (IL); Assaf Kasher, Haifa (IL); John Sadowsky, Mesa, AZ (US)

(73) Assignee: Intel Corporation, Santa Clara (*) Notice: Subject to any disclaimer, the term of this patent is extended or adjusted under 35 U.S.C. 154(b) by 763 days.

(21) Appl. No.: 10/812,385

(22) Filed: Mar. 30, 2004

(65) Prior Publication Data
US 2005/0220206 A1     Oct. 6, 2005

(51) Int. Cl.
*H04L 27/00* (2006.01)
*H04L 23/00* (2006.01)

(52) U.S. Cl. ...................... 375/295; 375/377
(58) Field of Classification Search ........ 375/260, 375/267, 299; 455/101; 370/208–210
See application file for complete search history.

(56) References Cited

U.S. PATENT DOCUMENTS 7,142,506 B1* 11/2006 Pogrebinsky .............. 370/229
2002/0021165 A1* 2/2002 Hwang et al. ............. 329/306
2002/0054610 A1* 5/2002 Reusens et al. ........... 370/480
2003/0016703 A1* 1/2003 Oldenborgh et al. ...... 370/535
2004/0022179 A1* 2/2004 Giannakis et al. ......... 370/207
2004/0148560 A1* 7/2004 Hocevar .................... 714/801
2005/0198092 A1* 9/2005 Shen et al. ................ 708/404

FOREIGN PATENT DOCUMENTS

CA      2 234 777      10/1999

OTHER PUBLICATIONS

Bangerberter, B. et al., "Wireless Technologies: High-Throughput Wireless LAN Air Interface", Intel Technology Journal, XX, US, vol. 7, No. 3, Aug. 19, 2003, pp. 47-57.
International Search Report from PCT/US2005/009336, mailed on Sep. 20, 2005.

* cited by examiner

*Primary Examiner*—Tesfladet Bocure
(74) *Attorney, Agent, or Firm*—Pearl Cohen Zedek Latzer LLP (57) ABSTRACT

Briefly, some embodiments of the invention may provide devices, systems and methods for wireless combined-signal communication. For example, a method in accordance with an embodiment of the invention may include transmitting a combined signal over a combined channel by mapping a first block of said combined signal to be carried by a first sub-channel of said combined channel and mapping a second block, substantially identical to said first block, to be carried by a second sub-channel of said combined channel.

21 Claims, 4 Drawing Sheets

DEVICE, SYSTEM AND METHOD FOR WIRELESS COMBINED-SIGNAL COMMUNICATION

BACKGROUND OF THE INVENTION

In the field of wireless communications, a first wireless communication station may transmit a signal to a second wireless communication station. The signal may be transmitted, for example, using Orthogonal Frequency Division Multiplexing (OFDM). The first wireless communication station may be configured to transmit the signal using a first channel having a first channel width. The second wireless communication station may be configured to receive signals using a second channel having a second channel width, which may be different from the first channel width.

Thus, the second wireless communication station may not be able to receive the signal transmitted by the first wireless communication station. Additionally or alternatively, the second wireless communication station may create noise or interference, e.g., by transmitting a second signal during transmission of the first signal by the first wireless communication station.

BRIEF DESCRIPTION OF THE DRAWINGS

The subject matter regarded as the invention is particularly pointed out and distinctly claimed in the concluding portion of the specification. The invention, however, both as to organization and method of operation, together with features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

It should be understood that embodiments of the invention may be used in a variety of applications. Although the invention is not limited in this respect, embodiments of the invention may be used in conjunction with many apparatuses, for example, a transmitter, a receiver, a transceiver, a transmitter-receiver, a wireless communication station, a wireless communication device, a wireless Access Point (AP), a modem, a wireless modem, a personal computer, a desktop computer, a mobile computer, a laptop computer, a notebook computer, a Personal Digital Assistant (PDA) device, a tablet computer, a server computer, a network, a Local Area Network (LAN), a Wireless LAN (WLAN), devices and/or networks operating in accordance with existing 802.11a, 802.11b, 802.11g, 802.11n standards and/or future versions of the above standards, a Personal Area Network (PAN), Wireless PAN (WPAN), units and/or devices which are part of the above WLAN and/or PAN and/or WPAN networks, one way and/or two-way radio communication systems, a cellular radio-telephone communication system, a cellular telephone, a wireless telephone, a Personal Communication Systems (PCS) device, a PDA device which incorporates a wireless communication device, or the like. It is noted that embodiments of the invention may be used in various other apparatuses, devices, systems and/or networks.

It is noted that the terms "combined" and "high-bandwidth", as used herein with reference to a signal or a channel, and do not necessarily indicate or imply absolute values of channel widths or throughput. For example, in accordance with exemplary embodiments of the invention, a "combined" signal may include first and second substantially identical signals, and may be carried using a "combined" channel which may include adjacent first and second sub-channels, respectively. The term "high-bandwidth" as used herein may not necessarily imply a property of high or relatively high transfer rate, but rather may indicate a signal carried by a channel having a high or relatively high channel width. In accordance with exemplary embodiments of the invention, a signal may be carried by a channel or a sub-channel having a channel width of W MHz; a "combined" signal may be carried by a "combined" channel which may include adjacent first and second sub-channels, the first sub-channel having a width of W MHz and the second sub-channel having a width of W MHz; and a "high-bandwidth" signal may be carried by a "high-bandwidth" channel which may have a channel width of nW MHz, wherein n may be a number greater than one, for example, 2.

The term "channel" as used herein may include, for example, one or more channels or bands, one or more sub-channels, a combination of channels or sub-channels, a combined channel, or a combined sub-channel.

Although part of the discussion herein may relate to a signal carried by a 20 MHz OFDM channel or sub-channel having 48 subcarriers, to a combined signal carried by a combined channel including two 20 MHz OFDM having 96 subcarriers in total, or to a high-bandwidth signal carried by a high-bandwidth 40 MHz channel having 96 subcarriers, these values are provided for exemplary purposes only. Embodiments of the invention are not limited in this regard, and may be used in conjunction with various other suitable channel types, channel widths, number of subcarriers, bands, ranges or values.

Figure 1:
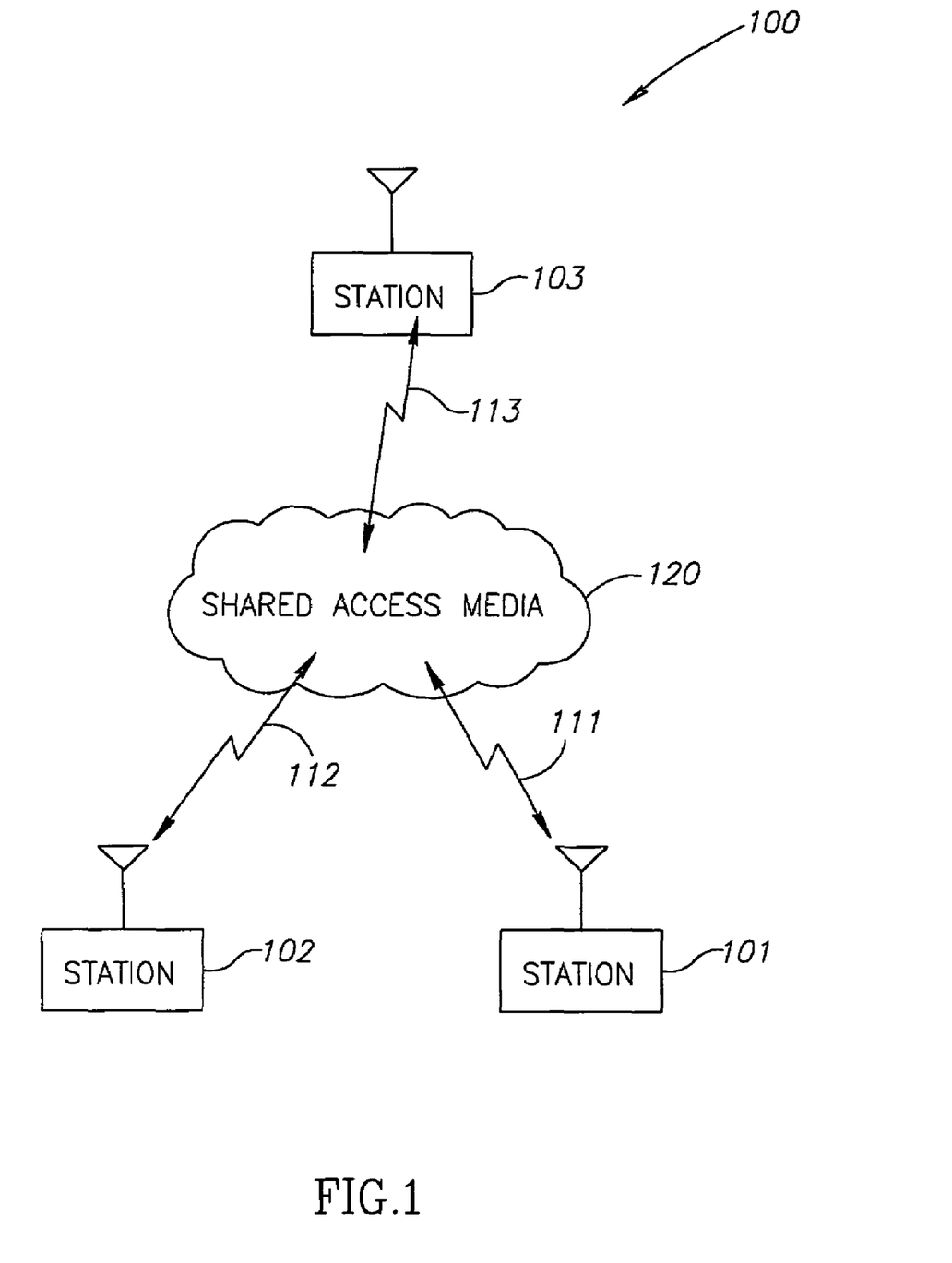
FIG. 1 is a schematic block diagram illustration of a wireless communication system which may include one or more wireless communication stations able to send and receive combined signals and high-bandwidth signals in accordance with exemplary embodiments of the invention.

Part of the discussion herein may relate, for exemplary purposes, to transmitting a combined signal over a combined channel. However, embodiments of the invention are not limited in this regard, and may include, for example, transmitting a combined block, a combined portion, a combined data sequence, a combined frame, a combined packet, a combined preamble, a combine signal field, a combined content, a combined data item, a combined message, or the like. Similarly, although part of the discussion herein may relate, for exemplary purposes, to duplicating a signal, embodiments of the invention are not limited in this regard, and may include, for example, duplicating a block, a portion, a data sequence, a frame, a packet, a preamble, a signal field, a content, a data item, a message, or the like FIG. 1 schematically illustrates a block diagram of a wireless communication system 100 which may include one or more wireless communication stations able to send and receive combined signals and high-bandwidth signals in accordance with exemplary embodiments of the invention. System 100 may include one or more wireless communication stations, for example, stations 101, 102 and 103.

Station 101, station 102 and/or station 103 may communicate among themselves over a shared wireless media 120, which may include, for example, wireless communication links 111, 112 and 113. For example, station 101 may communicate with one or more other stations of system 100 through link 111, station 102 may communicate with one or more other stations of system 100 through link 112, and station 103 may communicate with one or more other stations of system 100 through link 113.

In some embodiments, station 101 may produce a first signal and may duplicate it into a second, substantially identical signal. The first and second substantially identical signals, which may be referred to as a "combined signal", may be transmitted by station 101. This may be performed, for example, using a first and second adjacent sub-channels, respectively, which may be referred to as a "combined channel". The width of the first sub-channel may be substantially equal to the width of the second sub-channel. The combined channel may include, for example, two adjacent 20 MHz OFDM sub-channels.

In addition to transmitting the combined signal using the combined channel, station 101 may optionally transmit a second signal using a second channel, for example, a 40 MHz OFDM channel, which may be referred to as a "high-bandwidth signal" and a "high-bandwidth channel", respectively. The width of the high-bandwidth channel may be substantially equal, for example, to the sum of the widths of the two sub-channels of the combined channels.

Station 102 may be able to receive, analyze and process the combined signal transmitted by station 101 using the combined channel. Furthermore, station 102 may be able to receive, analyze and process the high-bandwidth signal transmitted by station 101 using the high-bandwidth channel.

Station 103 may be able to receive, analyze and process one of the two substantially identical signals included in the combined signal transmitted by station 101 using the combined channel. In some embodiments, station 103 may not be able to receive and process the high-bandwidth signal transmitted by station 101 using the high-bandwidth channel. In some embodiments, station 103 may be configured to avoid transmitting signals, e.g., by being idle or avoiding transmission, during a time period in which station 101 transmits the high-bandwidth signal.

Figure 2:
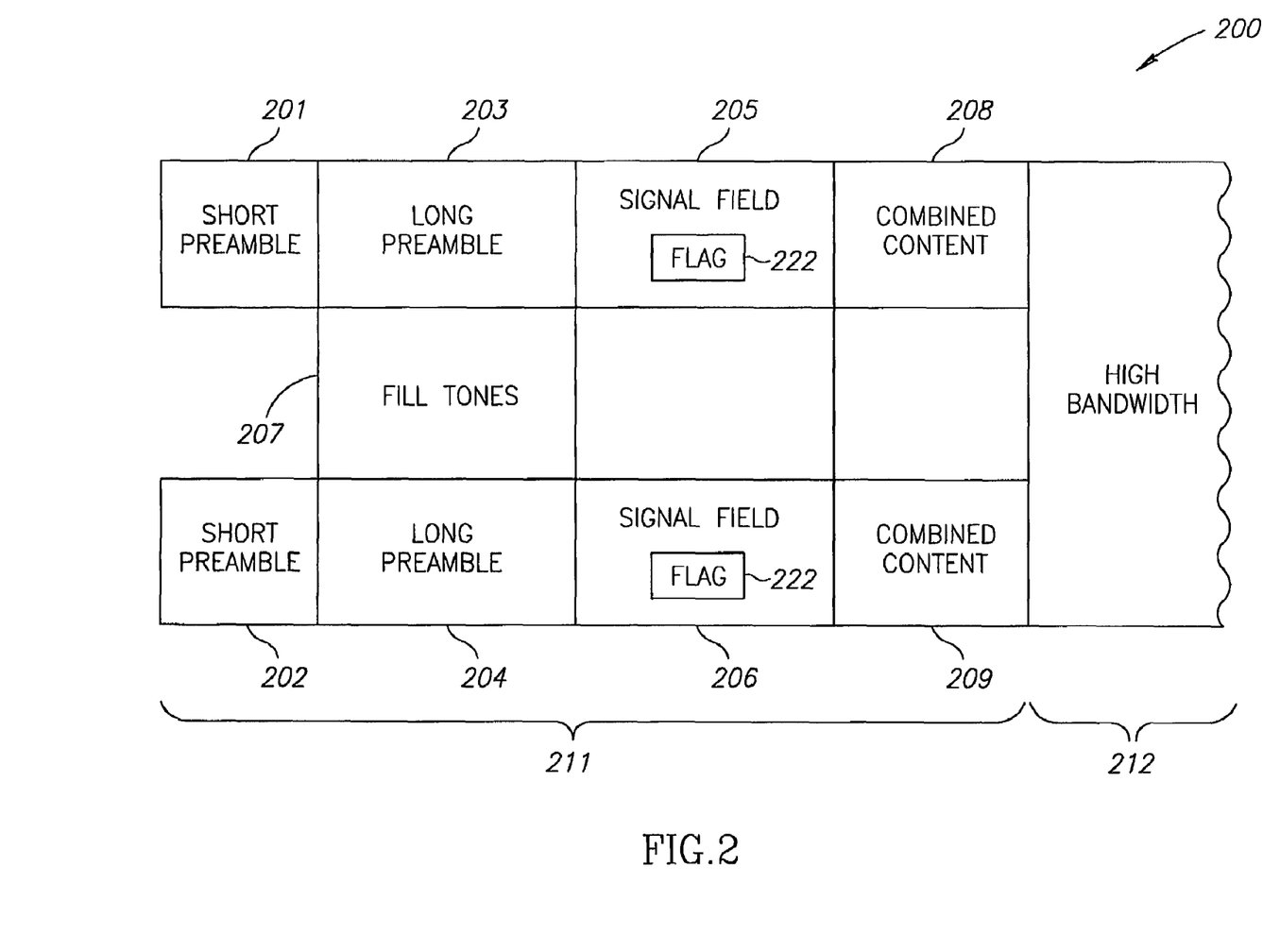
FIG. 2 is a conceptual representation of a transmission block produced and transmitted by a wireless communication station in accordance with exemplary embodiments of the invention.

FIG. 2 schematically illustrates a conceptual representation of a transmission block 200 produced and transmitted by a wireless communication station, e.g., station 101 of system 100, in accordance with exemplary embodiments of the invention. Transmission block 200 may include a combined portion 211 which may be followed, optionally, by a subsequent portion, e.g., a high-bandwidth portion 212.

Combined portion 211 may include content transmitted using first and second substantially identical signals, respectively. The first and second signals carrying combined portion 211 may be transmitted using a combined channel which may include first and second adjacent sub-channels, respectively. The width of the first sub-channel may be substantially equal to the width of the second sub-channel. The content represented by the first signal may be substantially identical to the content represented by the second signal.

High-bandwidth portion 212 may include content transmitted using a high-bandwidth signal, which may be transmitted using a high-bandwidth channel. The width of the high-bandwidth channel may be substantially equal to the total sum of the width of the first and second sub-channels carrying the first and second signals of the combined portion 211.

Combined portion 211 may include one or more headers, preambles, signal fields, rate fields, length fields, fields, indicators, flags, or other parameters indicating one or more properties of transmission block 200. For example, combined portion 211 may include short preambles 201 and 202, long preambles 203 and 204, and signal fields 205 and 206. Preambles 201, 202, 203 and/or 204 may include data indicating, for example, that transmission block 200 may include high-bandwidth portion 212. Transmission block 200 may optionally include one or more fill tones 207 which may facilitate channel estimation by a station receiving transmission block 200 as is known in the art.

Signal fields 205 and 206 may include data indicating, for example, one or more properties of high-bandwidth portion 212. For example, signal fields 205 and 206 may include data indicating a data transfer rate of high-bandwidth portion 212, which may be represented in Megabytes per second or other suitable units. Additionally or alternatively, signal fields 205 and 206 may include a rate field, for example, data indicating a data transfer rate of high-bandwidth portion 212, which may be represented in bytes per second or other suitable units. Additionally or alternatively, signal fields 205 and 206 may include a data size field, for example, data indicating a data size of high-bandwidth portion 212, which may be represented in bytes or other suitable units. Additionally or alternatively, signal fields 205 and 206 may include a length field, for example, data indicating an estimated or expected period of time in which high-bandwidth portion 212 may be transmitted, and which may be represented in seconds or other suitable units. Additionally or alternatively, signal fields 205 and 206 may include one or more flags 222 or other suitable indicators, which may be set or reset to indicate whether a high-bandwidth portion follows or does not follow, respectively, combined portion 211. In one embodiment, for example, a fourth bit in a rate field of signal fields 205 and/or 206 may be set to "zero" to indicate that transmission block 200 may include only combined portion 211, or may be set to "one" to indicate that transmission block 200 may additionally or alternatively include a high-bandwidth portion 212, or vice versa.

Optionally, in some embodiments, combined portion 211 may include combined content portions 208 and 209, which may include one or more messages or data items. In some exemplary embodiments, portion 208 may be substantially identical to portion 209.

It will be appreciated by persons skilled in the art that combined portion 211 may include other data, parameters, values, flags or indications related to the content or properties of transmission block 200, to the content or properties of combined portion 211, or to the content or properties of high-bandwidth portion 212. In some embodiments, combined portion 212 may include data indicating one or more operations that a receiving station or a receiver are required to perform or to avoid, for example, data indicating an instruction to perform reception of high-bandwidth portion 212, data indicating an instruction to avoid reception of high-bandwidth portion 212, data indicating an instruction to be idle or avoid transmission during the time period in which high-bandwidth portion 212 may be transmitted, or data indicating an instruction to avoid transmitting a signal or any signals during the time period in which high-bandwidth portion 212 may be transmitted.

Figure 3:
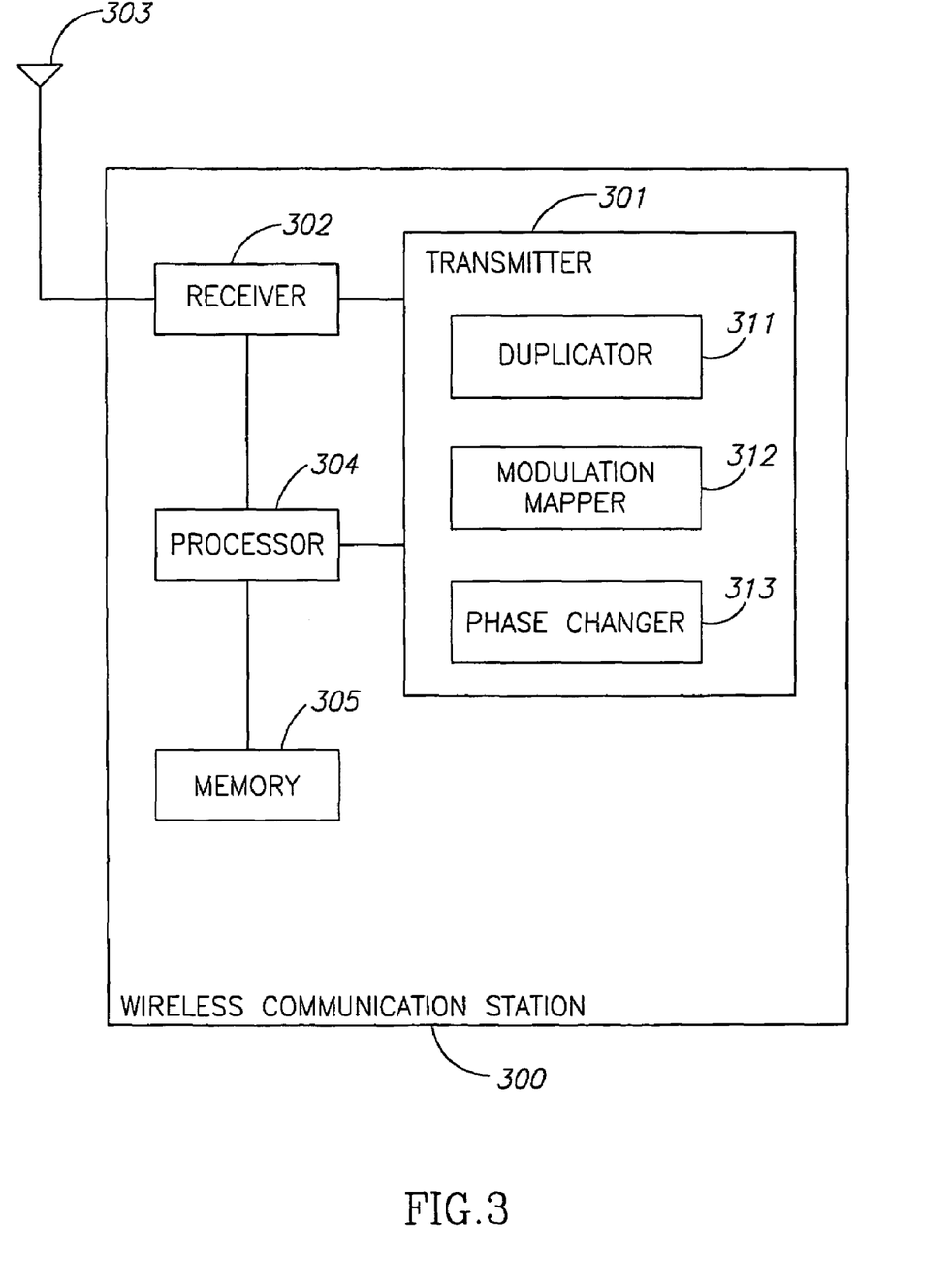
FIG. 3 is a schematic block diagram illustration of a wireless communication station able to send and receive combined signals and high-bandwidth signals in accordance with exemplary embodiments of the invention.

FIG. 3 schematically illustrates a block diagram of a wireless communication station 300 able to send and receive combined signals and high-bandwidth signals in accordance with exemplary embodiments of the invention. Station 300 may be an example of station 101 or station 102. Station 300 may include, for example, a transmitter 301, a receiver 302, and an antenna 303. Station 300 may optionally include a processor 304, a memory unit 303, and/or other suitable hardware components and/or software components.

Antenna 303 may include an internal and/or external Radio Frequency (RF) antenna. In some embodiments, for example, antenna 303 may include a dipole antenna, a monopole antenna, an omni-directional antenna, an end fed antenna, a circularly polarized antenna, a micro-strip antenna, a diversity antenna, or any other type of antenna suitable for sending and/or receiving wireless communication signals, blocks, frames, packets, messages and/or data.

Processor 304 may include, for example, a Central Processing Unit (CPU), a Digital Signal Processor (DSP), a microprocessor, a controller, a chip, a microchip, or any other suitable multi-purpose or specific processor or controller. In some embodiments, processor 304 may perform calculation operations or processing operations, which may be used in producing signals which may be transmitted by station 300 using a combined channel or a high-bandwidth channel. In some embodiments, processor 304 may analyze parameters or process data included in signals received by station 300 using a combined channel or a high-bandwidth channel.

Memory unit 305 may include, for example, a Random Access Memory (RAM), a Read Only Memory (ROM), a Dynamic RAM (DRAM), a Synchronous DRAM (SD-RAM), a Flash memory, a volatile memory, a non-volatile memory, a cache memory, a buffer, a short term memory unit, a long term memory unit, or other suitable memory units or storage units. In some embodiments, memory unit 305 may store data which may be used in producing or processing signals which may be transmitted or received using a combined channel or a high-bandwidth channel. In some embodiments, memory unit 305 may store data included in a signal which may be transmitted or received using a combined channel or a high-bandwidth channel.

Transmitter 301 may include, for example, a RF transmitter able to create and send signals using a combined channel or a high-bandwidth channel as detailed herein. Receiver 302 may include, for example, a RF receiver able to receive signals using a combined channel or a high-bandwidth channel as detailed herein. In some embodiments, transmitter 301 and receiver 302 may be implemented in the form of a transceiver, a transmitter-receiver, or one or more units able to perform separate or integrated functions of sending and/or receiving wireless communication signals, blocks, frames, packets, messages and/or data.

In some embodiments of the invention, transmitter 301 may include a duplicator 311, a modulation mapper 312, and optionally a phase changer 313. Transmitter 301 may generate a first signal, which may include a transmission block or a portion of a transmission block. Optionally, the first signal may be scrambled, encoded and/or interleaved as known in the art, for example, using a scrambler, an encoder and/or an interleaver, as is known in the art, which may be included in transmitter 301 or station 300.

Duplicator 311 may receive the first signal, and may duplicate it to provide a second signal substantially identical to the first signal. Modulation mapper 312 may produce a combined signal which may include the first and second substantially identical signals. The combined signal may be carried by a combined channel, which may include first and second adjacent sub-channels carrying the first and second substantially identical signals, respectively.

In some embodiments, the number of modulated OFDM subcarriers of the combined signal may be substantially equal to the total sum of the number of modulated OFDM subcarriers of the first and second signals, respectively. For example, in one embodiment, the first sub-channel may include 48 data modulated OFDM subcarriers and the second sub-channel may include 48 data modulated OFDM subcarriers.

Optionally, phase changer 313 may introduce a phase change between the first and second signals included in the combined signal. For example, phase changer 313 may produce a phase change of substantially 90 degrees between the first and second signals. In some embodiments, the specific phase change introduced between the first and second signals may be selected, for example, to improve or optimize a property of the combined signal, for example, to optimize a parameter of the combined signal to minimize a peak to average ratio of the signal.

It is noted that the combined signal produced by transmitter 301 may include a transmission block, for example, transmission block 200 as described above. Optionally, the transmission block may include parameters or data representing one or more properties of the transmission block or of subsequent transmission blocks. Such parameters or data may be introduced into the transmission block, for example, using transmitter 301 and/or processor 304.

Transmitter 301 may include an Inverse Fast Fourier Transform (IFFT) unit as is known in the art, which may perform an IFFT operation on the combined signal. Optionally, transmitter 301 may include a Digital to Analog Converter (DAC) as is known in the art, which may perform digital to analog conversion. The analog combined signal may be transmitted by station 300, for example, using antenna 303.

In some embodiments, receiver 302 may be adapted to receive combined signals and/or high-bandwidth signals, and may include various suitable types of RF receivers. For example, in one embodiment, receiver 302 may include a "legacy" RF receiver, able to receive a "legacy" signal which may be identical to one of the two substantially identical signals included in a combined signal. The "legacy" RF receiver may be able to receive, for example, a signal carried by a 20 MHz OFDM channel, which may be a sub-channel in a combined channel carrying a combined signal.

In an alternate embodiment, receiver 302 may include a RF receiver able to receive multiple types of signals, for example, a "legacy" signal a described above, a combined signal and a high-bandwidth signal. In one embodiment, receiver 302 may be adapted to receive the first and second substantially identical signals carried by the first and second adjacent sub-channels of a combined signal. This may be performed, for example, using an equalizer 321, a channel estimator 322 and a demapping unit 323, as is known in the art. This may allow, for example, an improved quality of reception and/or an increased reception range, in comparison to a "legacy" RF receiver able to receive only one of the first and second substantially identical signals.

In some embodiments, receiver 302 or processor 304 may be adapted to analyze a combined portion of a transmission block, and to perform or avoid one or more operations based on parameters or data included in the combined portion of the transmission block. In one embodiment, receiver 302 or processor 304 may be used to perform operations based on the analysis results, or to instruct other components of station 300 to perform or avoid operations, e.g., to instruct transmitter 301 to be idle or avoid transmission for a period of time in which a high-bandwidth portion of a transmission is expected.

Receiver 302 may optionally include other suitable units as is known in the art, for example, an Analog to Digital Converter (ADC), a Fast Fourier Transform (FFT) unit, a frequency tracking unit, a demapping unit, a deinterleaving unit, a decoder, and a descrambler.

Figure 4:
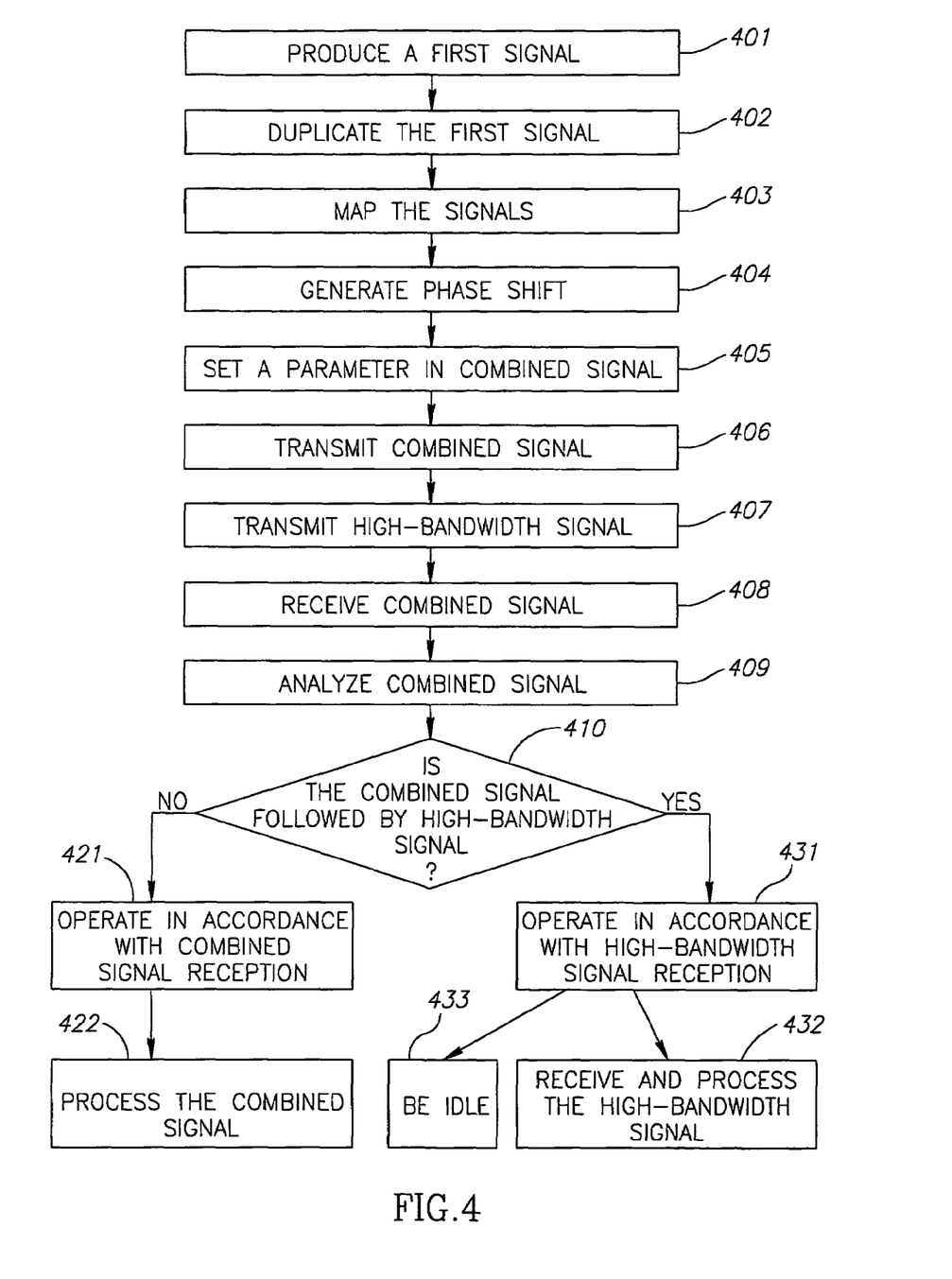
FIG. 4 is a schematic flow-chart of a method of communicating using combined signals and high-bandwidth signals in accordance with exemplary embodiments of the invention.

FIG. 4 is a schematic flow-chart of a method of communicating using combined signals and high-bandwidth signals in accordance with exemplary embodiments of the invention. The method may be used, for example, by system 100 of FIG. 1, by one or more of stations 101, 102 and 103 of FIG. 1, by station 300 of FIG. 3, by transmitter 301 of FIG. 3, by receiver 302 of FIG. 3, or by other suitable wireless communication devices, stations, systems and/or networks.

As indicated at box 401, the method may begin by producing a first signal carried by a first channel, for example, a 20 MHz OFDM channel having 48 data modulated OFDM subcarriers. This may be performed, for example, by station 101. Optionally, the first signal may be scrambled, encoded and/or interleaved, as is known in the art, for example, by station 101.

As indicated at box 402, the method may include duplicating the first signal and creating a second signal, which may be substantially identical to the first signal. As indicated at box 403, the method may further include mapping the first and second signals onto a first sub-channel and a second sub-channel, respectively, for example, two adjacent sub-channels or an upper sub-channel and a lower sub-channel, respectively.

As indicated at box 404, optionally, the method may include generating a phase shift between the first signal and the second signal, or between the first sub-channel and the second sub-channel, e.g., a phase shift of substantially 90 degrees. The first and second signals may be referred to as a combined signal, and the first and second sub-channel may be referred to as a combined channel.

As indicated at box 405, the method may include creating, setting, including or embedding one or more parameters in the combined signal, for example, in a header, a preamble, a signal field or other suitable portion of the combined signal. Setting the parameter may include, for example, modifying, setting or resetting a value of a parameter. The parameter may include, for example, a parameter indicating a property of the combined signal, a parameter indicating a property of a high-bandwidth signal which may follow the combined signal, a parameter indicating an instruction which a receiver or a receiving station is required to perform or avoid, and the like. In one embodiment, for example, the method may include setting or resetting a flag or a certain bit in a preamble of the combined signal.

As indicated at box 406, the method may include transmitting the combined signal, for example, by station 101. In some embodiments, the first and second signals may be transmitted, for example, substantially simultaneously or at least partially simultaneously; this may allow, for example, a sustained transmission in which the combined signal is carried over a combined channel. Optionally, as indicated at box 407, the method may further include transmitting a subsequent signal, e.g., a high-bandwidth signal, following the transmission of the combined signal. As indicated at box 408, the method may include receiving the combined signal, for example, by station 102.

As indicated at box 409, the method may include analyzing at least a portion of the combined signal, for example, by station 102. The analyzed portion may include, for example, one or more headers, preambles, signal fields, flags, indicators, bits or parameters which may be included in the received combined signal.

As indicated at box 410, the method may include checking whether the transmission of the combined signal may be followed by a transmission of a high-bandwidth signal. In one embodiment, for example, the determination may be based on a value of a parameter, a flag, a bit or a field included in the combined signal.

As indicated at box 421, if the check result is negative, then the method may include performing one or more operations based on the determination that the combined signal is not followed by a transmission of a high-bandwidth signal, or one or more operations in accordance with combined signal reception. For example, as indicated at box 422, the method may include processing the combined signal, processing at least a portion of the combined signal, or processing a non-preamble portion or a content portion of the combined signal. In some embodiments, this may include, for example, processing at least one of the first and second substantially identical signals included in the combined signal. In one embodiment, the processing may include Maximum Ratio Combining (MRC), e.g., as is know in the art.

Alternatively, as indicated at box 431, if the check result is positive, then the method may include performing one or more operations based on the determination that the combined signal is followed by a transmission of a high-bandwidth signal, or one or more operations in accordance with high-bandwidth reception. For example, in one embodiment, as indicated at box 432, the method may include receiving and processing the high-bandwidth signal. This may be performed, for example, by a station or a receiver capable of receiving and processing high-bandwidth signals. In an alternate embodiment, as indicated at box 433, the method may include, for example, avoiding transmission of a signal or any signals by the receiving station during at least the time period in which the high-bandwidth signal is expected to be transmitted. This may be performed, for example, by a station or a receiver not capable of receiving and processing the high-bandwidth signal, e.g., by being idle or avoiding transmission during that time period.

Other suitable operations or sets of operations may be used in accordance with embodiments of the invention, for example, to transmit a combined signal over a combined channel by mapping a first block of said combined signal to be carried by a first sub-channel of said combined channel and mapping a second block, substantially identical to said first block, to be carried by a second sub-channel of said combined channel.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by station 101, by station 102, by station 103, by station 300, by processor 304, by transmitter 301, by receiver 302, or by other suitable machines, cause the machine to perform a method and/or operations in accordance with embodiments of the invention. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit (e.g., memory unit 305), memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A method comprising:
    transmitting a combined signal over a combined channel by mapping a first block of said combined signal to be carried by a first sub-channel of said combined channel and mapping a second block, substantially identical to said first block, to be carried by a second sub-channel of said combined channel;
    duplicating said first block to produce said second block;
    creating an indication, in said first block, of a property of said combined signal; and
    creating an indication, in said first block, of whether said combined signal is followed by a subsequent signal carried by a channel having a channel width which is different from the channel width of the first sub-channel.

2. The method of claim 1, comprising receiving at least said first block.

3. The method of claim 2, comprising determining whether said combined signal is followed by said subsequent signal.

4. The method of claim 3, comprising receiving said subsequent signal.

5. The method of claim 3, comprising avoiding transmission during a time period in which said subsequent signal is transmitted.

6. The method of claim 1, comprising producing a phase shift between said first and second blocks.

7. An apparatus comprising:
    a transmitter to transmit a combined signal over a combined channel by mapping a first block of said combined signal to be carried by a first sub-channel of said combined channel and mapping a second block, substantially identical to said first block, to be carried by a second sub-channel of said combined channel, wherein the transmitter is able to duplicate said first block to produce said second block, and wherein the transmitter is able to create an indication, in said first block, of a property of said combined signal, and wherein the transmitter is able to create an indication, in said first block, of whether said combined signal is followed by a subsequent signal carried by a channel having a channel width which is different from the channel width of the first sub-channel.

8. The apparatus of claim 7, wherein the transmitter is able to produce a phase shift between said first and second blocks.

9. A wireless communication system comprising:
    a first wireless communication station able to transmit a combined signal over a combined channel by mapping a first block of said combined signal to be carried by a first sub-channel of said combined channel and mapping a second block, substantially identical to said first block, to be carried by a second sub-channel of said combined channel; and
    a second wireless communication station able to receive at least said first block, wherein-the first wireless communication station is able to duplicate said first block to produce said second block, and wherein the first wireless communication station is able to create an indication, in said first block, of a property of said combined signal, and wherein the first wireless communication station is able to create an indication, in said first block, of whether said combined signal is followed by a subsequent signal carried by a channel having a channel width which is different from the channel width of the first sub-channel.

10. The wireless communication system of claim 9, wherein the second wireless communication station is able to determine whether said combined signal is followed by said subsequent signal.

11. The wireless communication system of claim 10, wherein the second wireless communication station is able to receive said subsequent signal.

12. The wireless communication system of claim 10 wherein the second wireless communication station is able to avoid transmission during a time period in which said subsequent signal is transmitted.

13. The wireless communication system of claim 9, wherein the first wireless communication station is able to produce a phase shift between said first and second blocks.

14. A wireless communication station comprising:
- a radio frequency antenna; and
- a transmitter operably coupled to said radio frequency antenna to transmit a combined signal over a combined channel by mapping a first block of said combined signal to be carried by a first sub-channel of said combined channel and mapping a second block, substantially identical to said first block, to be carried by a second sub-channel of said combined channel, wherein the transmitter is able to duplicate said first block to produce said second block, and wherein the transmitter is able to create an indication, in said first block, of a property of said combined signal, and wherein the transmitter is able to create an indication, in said first block, of whether said combined signal is followed by a subsequent signal carried by a channel having a channel width which is different from the channel width of the first sub-channel.

15. The wireless communication station of claim 14, wherein the transmitter is able to produce a phase shift between said first and second blocks.

16. A machine-readable medium having stored thereon a set of instructions that, if executed by a machine, cause the machine to perform a method comprising:
  transmitting a combined signal over a combined channel by mapping a first block of said combined signal to be carried by a first sub-channel of said combined channel and mapping a second block, substantially identical to said first block, to be carried by a second sub-channel of said combined channel;
  duplicating said first block to produce said second block;
  creating an indication, in said first block, of a property of said combined signal; and creating an indication, in said first block, of whether said combined signal is followed by a subsequent signal carried by a channel having a channel width which is different from the channel width of the first sub-channel.

17. The machine-readable medium of claim 16, wherein the instructions result in receiving at least said first block.

18. The machine-readable medium of claim 17, wherein the instructions result in determining whether said combined signal is followed by said subsequent signal.

19. The machine-readable medium of claim 18, wherein the instructions result in receiving said subsequent signal.

20. The machine-readable medium of claim 18, wherein the instructions result in avoiding transmission during a time period in which said subsequent signal is transmitted.

21. The machine-readable medium of claim 16, wherein the instructions result in producing a phase shift between said first and second blocks.

* * * * *